United States Patent [19]

Boudart et al.

[11] Patent Number: 4,515,763

[45] Date of Patent: May 7, 1985

[54] HIGH SPECIFIC SURFACE AREA CARBIDES AND NITRIDES

[75] Inventors: Michel Boudart, Stanford; Shigeo T. Oyama, Palo Alto; Leo Volpe, Redwood City, all of Calif.

[73] Assignee: Board of Trustees of Leland Stanford Jr. Univeristy, Stanford, Calif.

[21] Appl. No.: 449,809

[22] Filed: Dec. 14, 1982

Related U.S. Application Data

[63] Continuation of Ser. No. 283,587, Jul. 15, 1981, abandoned.

[51] Int. Cl.$^3$ ............... C01B 21/26; C01B 31/34
[52] U.S. Cl. ............................. 423/409; 423/440
[58] Field of Search ............ 423/409, 411, 439, 440; 252/438, 440

[56] References Cited

U.S. PATENT DOCUMENTS

| | | | |
|---|---|---|---|
| 3,077,385 | 2/1963 | Robb | 423/440 |
| 3,416,891 | 12/1968 | Roubin et al. | 252/438 |
| 3,429,661 | 2/1969 | Neuenschwander et al. | 423/409 |
| 3,704,116 | 2/1972 | Paris et al. | 423/409 |
| 3,902,917 | 9/1975 | Barsel et al. | 423/440 |
| 4,022,872 | 5/1977 | Carson et al. | 423/409 |
| 4,073,866 | 2/1978 | Yamaki et al. | 252/443 |
| 4,190,439 | 2/1980 | Gortsema | 423/439 |

FOREIGN PATENT DOCUMENTS

| | | | |
|---|---|---|---|
| 545494 | 8/1957 | Canada | 423/440 |
| 1250796 | 9/1967 | Fed. Rep. of Germany | 423/440 |
| 2028535 | 12/1970 | Fed. Rep. of Germany | 423/409 |
| 12662 | of 1912 | United Kingdom | 423/409 |
| 951416 | 3/1954 | United Kingdom | 423/439 |

OTHER PUBLICATIONS

Fornwalt et al., Characterization of Ultra High Surface Area Tungsten Carbide, Micron, 1975, vol. 6, pp. 147–152.

Ghosh, S.P., Nitrides of Molybdenum, Journal of Indian Chemistry, vol. 29, #7, 1952, pp. 484–488.

*Primary Examiner*—Gary P. Straub
*Attorney, Agent, or Firm*—Bertram I. Rowland

[57] ABSTRACT

Method and compositions produced thereby concerning high specific surface area carbides and nitrides. The carbides and nitrides are obtained by thermal reduction of oxides in the presence of a source of carbon or nitrogen respectively, with relatively slow progressive temperature increases prior to completion of the reaction, followed by quenching.

12 Claims, No Drawings

HIGH SPECIFIC SURFACE AREA CARBIDES AND NITRIDES

CROSS-REFERENCE TO RELATED APPLICATIONS

This is a continuation of pending patent application Ser. No. 283,587, filed July 15, 1981, now abandoned.

BACKGROUND OF THE INVENTION

1. Field of the Invention

Carbides and nitrides of a wide variety of elements provide a great diversity of desirable properties; hardness, conductivity of electricity and heat; catalytic activity-making or breaking of many chemical bonds; electrocatalytic activity in fuel cells. In addition, many of the carbides and nitrides are highly refractory, being chemically inert and stable to exceedingly high temperatures. The carbides and nitrides tend to have high melting points so as to be capable of maintaining a solid phase in a wide variety of systems requiring elevated temperatures. In addition, some of the carbides and nitrides are hard, so as to be useful for grinding or to be used in conjunction with other materials for grinding.

In many of the applications of carbides and nitrides it is desirable to have a high specific surface area. This is particularly true where the carbide or nitride serves as a catalyst or is involved in a system requiring a large contact area, as for example the interaction between a gas phase and a solid phase. The problem of obtaining high specific surface area carbides and nitrides is acerbated with what are known as the non-refractory metals, such as iron. These low melting metals tend to sinter readily, resulting in substantial reduction of the surface area. Therefore, it would be extremely desirable to have a method for preparing carbides and nitrides of high specific surface area, both for the hard and soft metals, as well as other elements.

Description of the Prior Art

Descriptions of conventional carburizing and nitriding processes may be found in Kieffer and Schwarzkopf, Hartstoffe and Hartmetalle, Springer-Verlag, Vienna, 1953; Kieffer and Benesovsky, Encyclopaedia of Chemical Technology, 2nd ed. Vol. 4, p. 70; Vol. 13, p. 814; Wiley (Interscience), New York, 1964; Juza, Nitrides of Metals of the First Transition Series, in Advances in Inorganic Chemistry and Radiochemistry, Vol. 9, Academic Press, New York and London, 1966; Kosolopova, Carbides, Plenum Press, New York, 1971; and Toth, Transition Metal Carbides and Nitrides, Academic Press, New York and London, 1971. References concerned with the production of high surface catalysts include Böhm and Pohl, Troisiemes Journeer Internat. D'Etude des Piles a Combustible, p. 183, P.A.E., Bruxelles, 1969; Sokolsky et al., Elecktrokhimiiya 8, 1745 (1972) and Svata and Zabransky, Z. Colln. Czech. Cehm. Commun. 39, 1015 (1974). Improved processes for enhanced surface tungsten carbide may be found in Ross and Stonehart, J. Catal. 48, 42 (1977) and Mozulewskii et al., Kin. and Kataliz. 18, 767 (1977). Imura et al., Preparation of Catalysts II, Vol. 3, p. 627, Elsevier Scientific Publishing Co., (1979), describe the preparation of high specific surface area molybdenum oxycarbides.

SUMMARY OF THE INVENTION

Methods are provided for producing high surface area carbides and nitrides which find diverse application. The method requires reducing an oxide in a reducing atmosphere at an elevated temperature in the presence of a source of carbon or nitrogen while raising the temperature progressively to completion of the formation of the carbide or nitride and quenching the product after completion. Desirably, the conditions are chosen to avoid formation of surface carbon aggregates during carbide formation.

DESCRIPTION OF THE SPECIFIC EMBODIMENTS

High specific surface area carbides and nitrides are produced by reducing oxides of the desired element in a reducing atmosphere at an elevated temperature in the presence of a source of carbon or nitrogen respectively. Prior to completion of the reaction, the rate of thermal increase is controlled at a relatively slow rate and the rate of reduction monitored. When reduction has substantially slowed or ceased, the product may be optionally maintained at the elevated temperature for a limited period of time, and at the completion of heating is rapidly quenched. The resulting product is a carbide or nitride having substantially higher specific surface area, at least 2-fold and generally greater, than is obtained by conventional techniques, where the elemental metal is contacted with a carbon or nitrogen source at a fixed temperature and the reaction allowed to go to completion.

A wide variety of elements form stable carbides an/or nitrides. These elements include groups 3b to 7b, 8, 3a, 4a, of the Periodic Table, as well as the lanthanides and actinides, although other elements not included in those groups are also known to form carbides and/or nitrides. (Periodic Table of The Handbook of Chemistry and Physics, 44th ed., Chemical Rubber Publ. Co., 1962, pp. 448-449). Of particular interest are the elements 4b-7b, more particularly 5b-7b, and preferably 6b, as well as the first row of group 8, elements of atomic number 26 to 28. Included among the elements of interest are titanium, vanadium, chromium, manganese, iron, cobalt, nickel, molybdenum, zirconium, niobium, tantalum, hafnium, rhenium, and tungsten, plus the transition metal elements.

The carbides and nitrides of particular interest are those referred to as the interstitial alloys and are frequently characterized by electrical conductivity approaching that of the metals, extreme hardness and high melting points. The nitrides of interest are primarily characterized by being stable at elevated temperatures.

The method employs heating an oxide of the desired element at a temperature below the melting point of the oxide and the sintering temperature of the product and through a temperature range where reduction and reaction with a source of carbon or nitrogen occurs. The heating is done through the range over a predetermined time period and temperature range to reach completion, at which time the product is desirably rapidly quenched, so as to leave a high surface area carbide or nitride product as a powder. The state of oxidation is of the oxide of the desired element will vary widely, depending upon the availability of stable oxides, the economic use of hydrogen, the stability of the particular oxide, and its availability as a powder. The oxide will be used as a powder. The specific surface area will normally be increased by at least about 2-fold, more usually at least about 5-fold, and preferably at least about 10-fold greater than the specific surface area of the starting material oxide. The powdered oxide can be employed in a fixed bed or fluid bed, usually a fixed bed. The gas stream may be passed upwardly or downwardly through the bed, depending upon the nature of the bed, the rate of flow, and the size and density of the particles.

The reducing environment will be a hydrogen gas stream containing a source of carbon or nitrogen. Inert gases may be present, but are not necessary. The rate of flow may be varied widely primarily determined by ensuring ample amounts of the gaseous reactants being available and desirably removing the water which is formed from the product. That is, the rate of flow is chosen, so that at all times, at least an excess amount of hydrogen is present and at least a stoichiometric amount of carbon or nitrogen is present to provide for the amount required for rapid reaction during the interval in which the gas is in contact with the solid phase as well as providing a sweeping away of the water vapor. While the flow rate is not critical to this invention, except as described above, convenient space velocities have been in the range of about 5,000 to about 50,000 $h^{-1}$. The mole ratio of hydrogen to carbon or nitrogen source may be varied widely, so long as the above indicated amounts are continuously present. When carbiding, the mole ratio of hydrogen to carbon source will generally be greater than about 2 to 1 and may be as high as about 10 to 1, more usually being about 2-8:1, frequently about 3-6:1. Desirably when carbiding, the mole ratio of hydrogen and carbon source is at about the equilibrium ratio at the highest temperature used for the carburization to avoid the formation of graphitic or amorphous carbon. Since the carbon source will normally be a hydrocarbon, particularly methane, one looks to the ratio of hydrogen to hydrocarbon for formation of one molecule of the average composition of the carbide to determine the appropriate mole ratio in the gas stream.

As indicated, the carbon source will normally be a hydrocarbon, particularly methane, but can be other carbon compounds, such as carbon monoxide, which will react with the oxide under reducing conditions to form a carbide. While hydrocarbons higher than methane may be employed, they will frequently be more susceptible to form surface carbon aggregates, which will be particularly undesirable when preparing a catalytic material. In other situations, where either carbon would not be of concern or its presence may be of interest, higher hydrocarbons could be desirable.

Nitrogen hydrides can conveniently be used for nitriding, although for economy and efficiency, ammonia will normally be used.

Besides the hydrogen, carbon source and nitrogen source, inert gases may also be used up to about 80 volume percent, preferably below about 60 volume percent and may be entirely excluded.

The reaction is carried out by placing the powder in an appropriate reaction zone and passing the mixed gas through the powder. The temperature may be raised at a reasonably rapid rate up to prior to significant reduction and formation of the carbide or nitride. At least about 25° K. prior to completion, usually at least about 50° K. prior to completion, more usually at least about 100° K. and preferably at least about 150° K. prior to completion the temperature increase will be slowed, so that the reaction requires at least about 20 minutes for completion, preferably at least about 30 minutes for completion. The rate of increase may be linear or nonlinear, but should at least be reasonably uniform. On the average, during the slow period of temperature increases, the temperature increase should vary from about 0.1° to 5° K./minute, more usually from about 0.25° to 5° K./minute, generally from about 0.25° to 4.5° K./minute, preferably from about 0.5° to 4° K./minute.

The temperature is continuously raised during the slow period until completion of reaction. While the completion may be determined in a variety of ways, one can monitor the gas effluent and by monitoring its composition as to mole ratios, hydrogen content, water, or the like, determine when there is no further reaction. At this time, heating may be promptly stopped and the reaction quenched so that there is no further reaction occuring. While preferably the reaction is rapidly quenched shortly prior to completion or at completion (as indicated by the gas stream effluent) the temperature may be maintained for a limited period of time, usually the lesser of one hour or fifty percent of the time for the reaction to go to completion, usually less than about twenty-five percent of the time for the reaction to go to completion (as indicated by monitoring the effluent). Generally, no substantial advantages are observed by maintaining the temperature after the effluent composition remains substantially constant. After quenching the reaction, the resulting powder may then be isolated as a fine powder having substantially enhanced specific surface area.

The subject invention finds particular application in the preparation of catalytic materials. In the case of catalytic materials, passivation is sometimes required. Passivation requires that the catalytic material be exposed to a small amount of an oxidizing agent, normally oxygen, to provide for a thin stable oxide coating over the catalyst. Passivation techniques are well known and need not be exemplified here.

The catalytic materials of particular interest are the molybdenum, tungsten, vanadium, chromium, manganese, iron, cobalt and nickel carbides and titanium, zirconium, hafnium, vanadium, molybdenum and tantalum nitrides.

The following examples are offered by way of illustration and not by way of limitation.

EXPERIMENTAL

The apparatus employed essentially of a modified Perkin-Elmer Model 212C sorptometer. The gas flow controllers allow the mixing of gases, for example hydrogen, argon and methane. The gas mixture passes through the reference side of a thermal conductivity detector, after which it is lead through stainless steel and glass fittings to a quartz cell containing the sample. The gaseous effluent passes through an activated silicon dioxide trap which removes water from the gaseous stream and the dried stream then passed through the sample side of the thermal conductivity cell. The thermal conductivity detector monitors the extent of reduction by detecting changes in hydrogen concentration. Where no hydrogen is consumed the signal is zero. The flow rate of the gas is measured at the exit of the detector with a bubble flow meter.

The quartz cell reactor is a modified U-tube with the sample at the bottom of the sample U-tube, which is inside a Hoskins Electric Furnace (Model FA120). The temperature is measured by a thermocouple clamped on the outside of the tube next to the sample. The furnace temperature is controlled by a Thermac controller (Research Incorporated Control), with a controller monitored by Data Trak programmer also from the same supplier. The output from the thermal conductivity detector is recorded on a chart recorder.

In order to demonstrate the subject invention, the following experiments were carried out.

| MoO$_3$ | 1.3401 g |
|---|---|
| Flow rate, cc/min | |
| H$_2$ | 202 |
| CH$_4$ | 47 |

| Time/Temp. profile | | |
|---|---|---|
| Time (min) | Temp °K. | Flow rate cc/min |
| 0 | 768 | 235 |
| 10 | 789 | 236 |
| 20 | 805 | 233 |
| 40 | 834 | 232 |
| 51 | 850 | 229 |
| 59 | 863 | 221 |
| 62 | 868 | 209 |
| 63 | 870 | 215 |
| 64 | 871 | 224 |
| 65 | 872 | 228 |
| 70 | 880 | 229 |
| 91 | 923 | 226 |
| 101 | 938 | 226 |
| 118 | 961 | 236 |
| 130 | 976 | 237 |
| 140 | 994 | 230 |
| 145 | 1000 | 231 |
| 147 | terminate | |

The following table compares the chemisorption properties of the molybdenum carbide catalyst prepared as described above and a conventional molybdenum catalyst. The tests employed for determining the properties are conventional.

| Catalyst | CO uptake μmol/g | BET Specific Surface Area m$^2$/g | Density of Surface Metal Atoms 10$^{14}$ cm$^{-2}$ |
|---|---|---|---|
| Invention | 262 | 51.0 | 3.1 |
| Conventional | 37 | 12.5 | 1.8 |

It is evident from the above results, by employing the subject invention, carbides can be obtained having greatly enhanced specific surface area as well as improved catalytic properties.

In the next experiment molybdenum nitride was prepared. About 1 g high purity MoO$_3$ powder was loaded into a quartz microreactor as a packed bed supported on a porous quart frit and placed in the center of a furnace controlled by a temperature programmer. The local temperature was measured by a chromel-alumel thermocouple. Anhydrous ammonia at atmospheric pressure was passed through the reactor at 100 cc (NTP)/min from the top. The sample was rapidly heated to 690° K., followed by a linear temperature increase between 690° and 740° K. at a rate of 0.01° K./sec, a temperature increase from 740° to 970° K. at a linear rate of 0.05° K./sec, followed by maintaining the sample at 970° K. for 0.5 hr. The entire process took under four hours. The product had the following properties. BET specific surface area of 188 m$^2$/g, and CO uptake of 1280 μmol/g.

The product was passivated by flowing 1%O$_2$/He in the sample product, which reduced the BET specific surface area to 163 m$^2$/g.

The activity in the ammonia synthesis of Mo$_2$C prepared in a temperature programmed manner is reported in the table below. The activity is compared to that of a ruthenium catalyst and a doublypromoted iron catalyst, resembling the commercial iron catalyst. The comparison is important since ruthenium and iron are considered to be the most active metals for the synthesis. The rate measurements were carried out in an integral flow reactor at atmospheric pressure with a stoichiometric H$_2$-N$_2$ feedstream. The activity is reported as a site time yield, Y, defined as the average number of ammonia molecules produced per surface metal atom in the catalytic bed. It is obtained from experimental quantities by $$Y = \frac{uy}{vwA}$$

where u is the flow rate of synthesis gas leaving the reactor in cm$^3$s$^{-1}$ measured at ambient conditions, y is the mole fraction of NH$_3$ in the gas mixture leaving the reactor, $\bar{v}$ is the molar volume of an ideal gas at the conditions of u measurement, w is the weight of catalyst in the reactor and A is the number of metallic surface atoms per unit catalyst weight. The latter number is obtained by standard chemisorption of CO at Dry-Ice-/acetone bath temperature, and in the case of ruthenium by the chemisorption of H$_2$ at room temperature.

Because the ammonia synthesis reaction is limited by equilibrium, the site time yield is best expressed as a function of both temperature and distance from equilibrium. A measure of the latter quantity is the efficiency, θ, defined as the mole fraction of ammonia leaving the reactor normalized by the equilibrium mole fraction at reactor conditions.

| Steady-State Activity of Catalysts in Ammonia Synthesis at 673° K. | | |
|---|---|---|
| Catalyst | Efficiency η | Site Time Yield Y/10$^{-3}$ s$^{-1}$ |
| Mo$_2$C | .10 | 2.6 |
| 5% Ru/Al$_2$O$_3$ | .10 | .83 |
| Mo$_2$C | .40 | .73 |
| Fe—K$_2$O—Al$_2$O$_3$ | .40 | 14.0 |

As can be seen, the activity of the molybdenum carbide is in between that of the ruthenium and iron catalysts.

It is evident from the above results, that the subject invention provides a new, useful and efficient way for greatly enhancing the specific surface area of a wide variety of carbides and nitrides. By virtue of this invention, more effective catalysts can be produced, as well as novel supports, abrading materials, and the like. The enhanced surface area provides for enhanced cataytic activity as well as a wide variety of other desirable physical characteristics.

Although the foregoing invention has been described in some detail by way of illustration and example for purposes of clarity of understanding, it will be obvious that certain changes and modifications may be practiced within the scope of the appended claims.

What is claimed is:

1. A method for preparing high specific surface area molybdenum and vanadium carbides and nitrides from an oxide, said carbides and nitrides having at least a 5-fold increase in surface area over said oxide,
   which method comprises:

in a first heating, heating said oxide to a temperature prior to significant reduction and formation of said carbide or nitride;

in a second heating following said first heating, continuing heating of said oxide substantially uniformly and continuously at a rate in the range of about 0.1° to 5° K./min in the presence of a reducing environment and a source of carbon or nitrogen from a time at least 20 minutes prior to the time of completion of formation of said carbide or nitride and at a temperature at least 25° K. prior to substantial completion of formation of said carbide or nitride, and through a temperature range where reduction of said oxide and reaction with carbide and nitrogen occurs to form a carbide or nitride respectively, said heating continuing until said reaction is substantially complete as evidenced by the substantial absence of change in the effluent composition; and quenching the reaction by lowering the temperature within the lesser of about one hour or about 50 percent of the time of said second heating.

2. A method according to claim 1, wherein at at least about 75° K. prior to said substantial completion, the temperature is raised at a rate of about 0.1° to 5° K.

3. A method according to claim 1, wherein said source of carbon is methane.

4. A method according to claim 1, wherein said source of nitrogen is ammonia.

5. A method for preparing a high specific surface area molybdenum or vanadium carbide from an oxide, said carbide having at least a 5-fold increase in surface area over said oxide, which method comprises:

in a first heating, heating said oxide to a temperature prior to significant reduction and formation of said carbide;

in a second heating following said first heating, continuing heating of said oxide substantially uniformly and continuously at a rate in the range of about 0.1° to 5° K./min in the presence of a reducing environment and a source of carbon from a time at least 20 minutes prior to the time of completion of formation of said carbide and at a temperature at least 25° K. prior to substantial completion of formation of said carbide, and through a temperature range where reduction of said oxide in reaction with carbon occurs to form a carbide, said heating continuing until said reaction is substantially complete as evidenced by the substantial absence of change in the effluent composition; and quenching the reaction by lowering the temperature within the lesser of about one hour or about 50 percent of the time of said second heating.

6. A method according to claim 5, wherein said metal carbide is a catalyst.

7. A method according to claim 6, wherein said metal is molybdenum.

8. A method according to claim 5, wherein said lowering of said temperature occurs substantially immediately after completion.

9. A method for preparing high specific surface area molybdenum and vanadium nitrides from an oxide, said nitrides having at least a 5-fold increase in surface area over said oxide, which method comprises:

in a first heating, heating said oxide to a temperature prior to significant reduction and formation of said nitride;

in a second heating following said first heating, continuing heating of said oxide substantially uniformly and continuously at a rate in the range of about 0.1 to 5%/min in the presence of a gaseous source of hydrogen and nitrogen from a time at least 20 minutes prior to the time of completion of formation of said nitride and at a temperature at least 25° K. prior to substantial completion of formation of said nitride, and through a temperature range where reduction of said oxide in reaction with nitrogen occurs to form a nitride, said heating continuing until said reaction is substantially complete as evidenced by the substantial absence of change in the effluent composition; and quenching the reaction by lowering the temperature within the lesser of about one hour or about 50 percent of the time of said second heating.

10. A method according to claim 9, wherein said source of nitrogen is ammonia.

11. A method according to claim 9, wherein said lowering of said temperature occurs substantially immediately after completion.

12. A method according to claim 9, wherein said metal is molybdenum.

* * * * *

UNITED STATES PATENT AND TRADEMARK OFFICE
CERTIFICATE OF CORRECTION

PATENT NO. : 4,515,763

DATED : May 7, 1985

INVENTOR(S) : Michel Boudart et al.

It is certified that error appears in the above—identified patent and that said Letters Patent is hereby corrected as shown below:

On the first page of the patent, second column, at the end of the ABSTRACT section, insert the following:

--This work was supported by a research grant from the National Science Foundation (DMR77-24222).--

Signed and Sealed this

Fourteenth Day of January 1986

[SEAL]

Attest:

Attesting Officer

DONALD J. QUIGG

Commissioner of Patents and Trademarks